United States Patent
Ren et al.

(10) Patent No.: US 12,482,062 B2
(45) Date of Patent: Nov. 25, 2025

(54) REAL-TIME NEURAL LIGHT FIELD ON MOBILE DEVICES

(71) Applicants: Jian Ren, Hermosa Beach, CA (US); Pavlo Chemerys, North Holland (NL); Vladislav Shakhrai, London (GB); Ju Hu, Los Angeles, CA (US); Denys Makoviichuk, Playa Vista, CA (US); Sergey Tulyakov, Santa Monica, CA (US); Junli Cao, Pittsburgh, PA (US)

(72) Inventors: Jian Ren, Hermosa Beach, CA (US); Pavlo Chemerys, North Holland (NL); Vladislav Shakhrai, London (GB); Ju Hu, Los Angeles, CA (US); Denys Makoviichuk, Playa Vista, CA (US); Sergey Tulyakov, Santa Monica, CA (US); Junli Cao, Pittsburgh, PA (US)

(73) Assignee: Snap Inc., Santa Monica, CA (US)

( * ) Notice: Subject to any disclaimer, the term of this patent is extended or adjusted under 35 U.S.C. 154(b) by 321 days.

(21) Appl. No.: 18/080,959

(22) Filed: Dec. 14, 2022

(65) Prior Publication Data
US 2024/0202869 A1 Jun. 20, 2024

(51) Int. Cl.
G06T 3/4046 (2024.01)
G06T 3/4053 (2024.01)

(52) U.S. Cl.
CPC .......... *G06T 3/4046* (2013.01); *G06T 3/4053* (2013.01)

(58) Field of Classification Search
CPC ...... G06T 3/4046; G06T 3/4053; G06T 11/00
See application file for complete search history.

(56) References Cited

PUBLICATIONS

Wafa et al., "Light Field GAN-based View Synthesis using full 4D information", Dec. 1, 2022, Association for Computing Machinery, pp. 1-7 (Year: 2022).*

Meng et al., "High-dimensional Dense Residual Convolutional Neural Network for Light Field Reconstruction", Sep. 17, 2020, Journal of Latex Class Files, pp. 1-14 (Year: 2020).*

Cao Junli et al: "Real-Time Neural Light Field on Mobile Devices", 2023 IEEE/CVF Conference on Computer Vision and Pattern Recognition (CVPR), IEEE, Jun. 17, 2023 (Jun. 17, 2023), pp. 8328-8337.

(Continued)

*Primary Examiner* — Chan S Park
*Assistant Examiner* — Daniel C Chang
(74) *Attorney, Agent, or Firm* — CM Law; Stephen J. Weed

(57) ABSTRACT

A neural light field (NeLF) that runs real-time on mobile devices for neural rendering of three dimensional (3D) scenes, referred to as MobileR2L. The MobileR2L architecture runs efficiently on mobile devices with low latency and small size, and it achieves high-resolution generation while maintaining real-time inference for both synthetic and real-world 3D scenes on mobile devices. The MobileR2L has a network backbone including a convolutional layer embedding an input image at a resolution, residual blocks uploading the embedded image, and super-resolution modules receiving the uploaded embedded image and rendering an output image having a higher resolution than the embedded image. The convolution layer generates a number of rays equal to a number of pixels in the input image, where a partial number of the rays is uploaded to the super-resolution modules.

17 Claims, 8 Drawing Sheets

(56) References Cited

PUBLICATIONS

Huan Wang et al: "R2L: Distilling Neural Radiance Field to Neural Light Field for Efficient Novel View Synthesis", arxiv.org, Cornell University Library, 201 Olin Library Cornell University Ithaca, NY 14853, Jul. 23, 2022 (Jul. 23, 2022).
International Search Report and Written Opinion for International Application No. PCT/US2024/083507, dated Apr. 16, 202r (Apr. 16, 2024)—14 pages.
Meng Nan et al: "High-Dimensional Dense Residual Convolutional Neural Network for Light Field Reconstruction", IEEE Transactions on Pattern Analysis and Machine Intelligence, IEEE.Computer Society, USA, vol. 43, No. 3, Oct. 1, 2019 (Oct. 1, 2019), pp. 873-886.
Wafa, Abrar et al: "Light Field GAN-based View Synthesis using full 4D information", Proceedings of the 23rd International Middleware Conference: Tutorials, ACMPUB27, New York, NY, USA, Dec. 1, 2022 (Dec. 1, 2022), pp. 1-7.

\* cited by examiner

REAL-TIME NEURAL LIGHT FIELD ON MOBILE DEVICES

TECHNICAL FIELD

The present subject matter relates to Neural Light Field (NeLF).

BACKGROUND

Neural Rendering Fields (NeRFs) have shown improved results on novel view synthesis by utilizing implicit neural representation to represent 3D scenes. Due to the process of volumetric rendering, the inference speed for NeRF is extremely slow, limiting the application scenarios of utilizing NeRF on resource-constrained hardware, such as mobile devices. To reduce the latency of running NeRF models, most of them still require a high-end graphical processing unit (GPU) for acceleration or extra storage memory, which are all unavailable on mobile devices. An emerging direction utilizes a neural light field (NeLF) for speedup, as only one forward pass is performed on a ray to predict the pixel color. Nevertheless, to reach a similar rendering quality as NeRF, the network in NeLF is designed with intensive computation, which is not mobile-friendly.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

Figure 1:
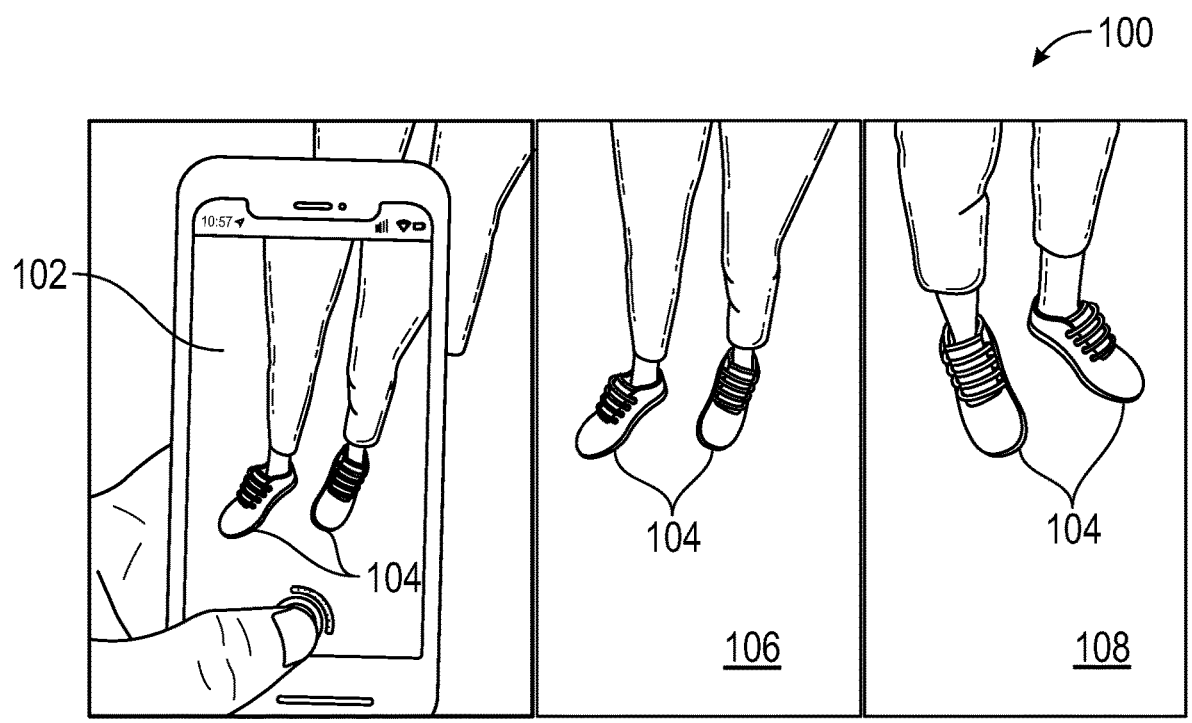
Figure 2:
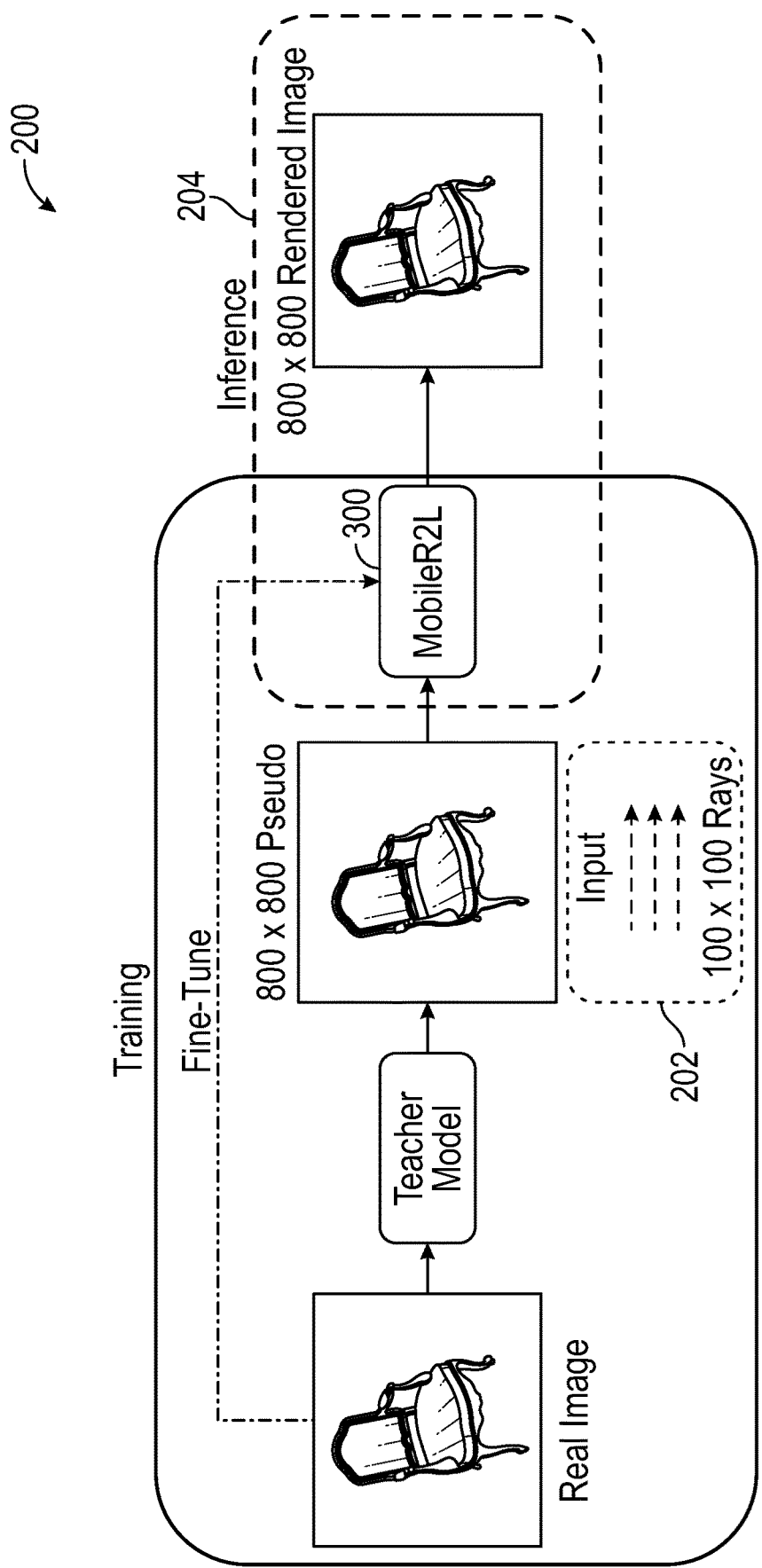
Figure 3:
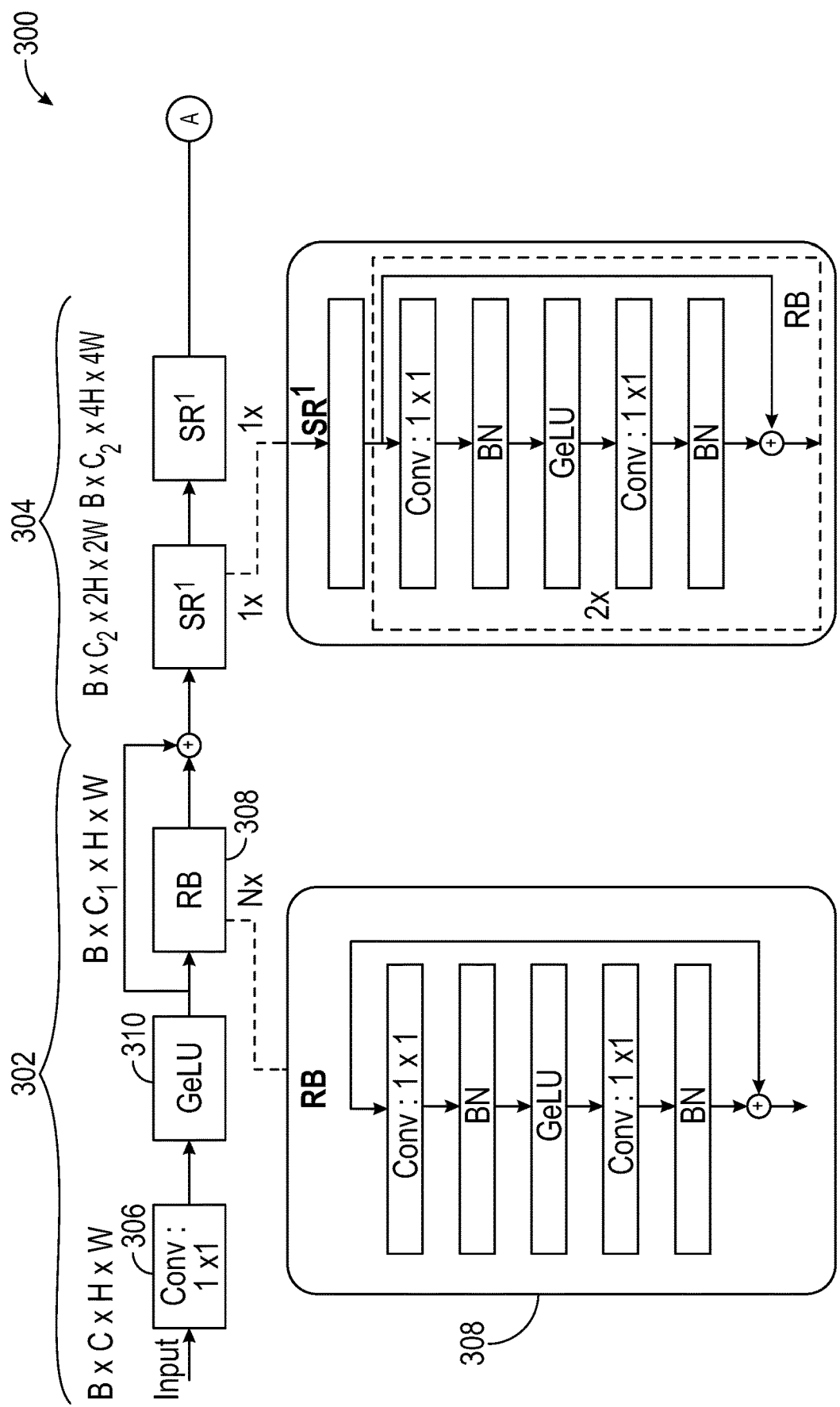
Figure 3:
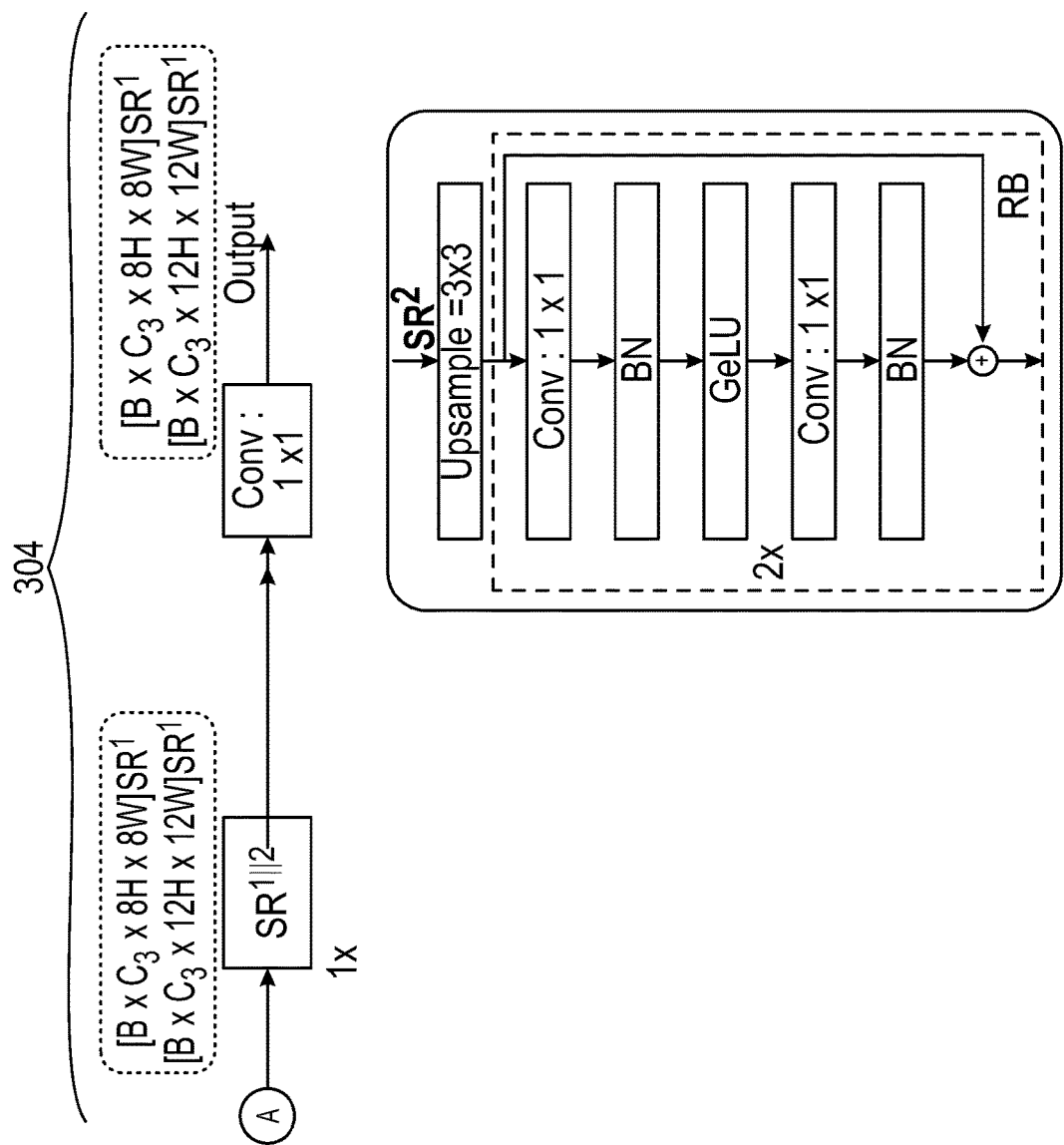
Figure 4:
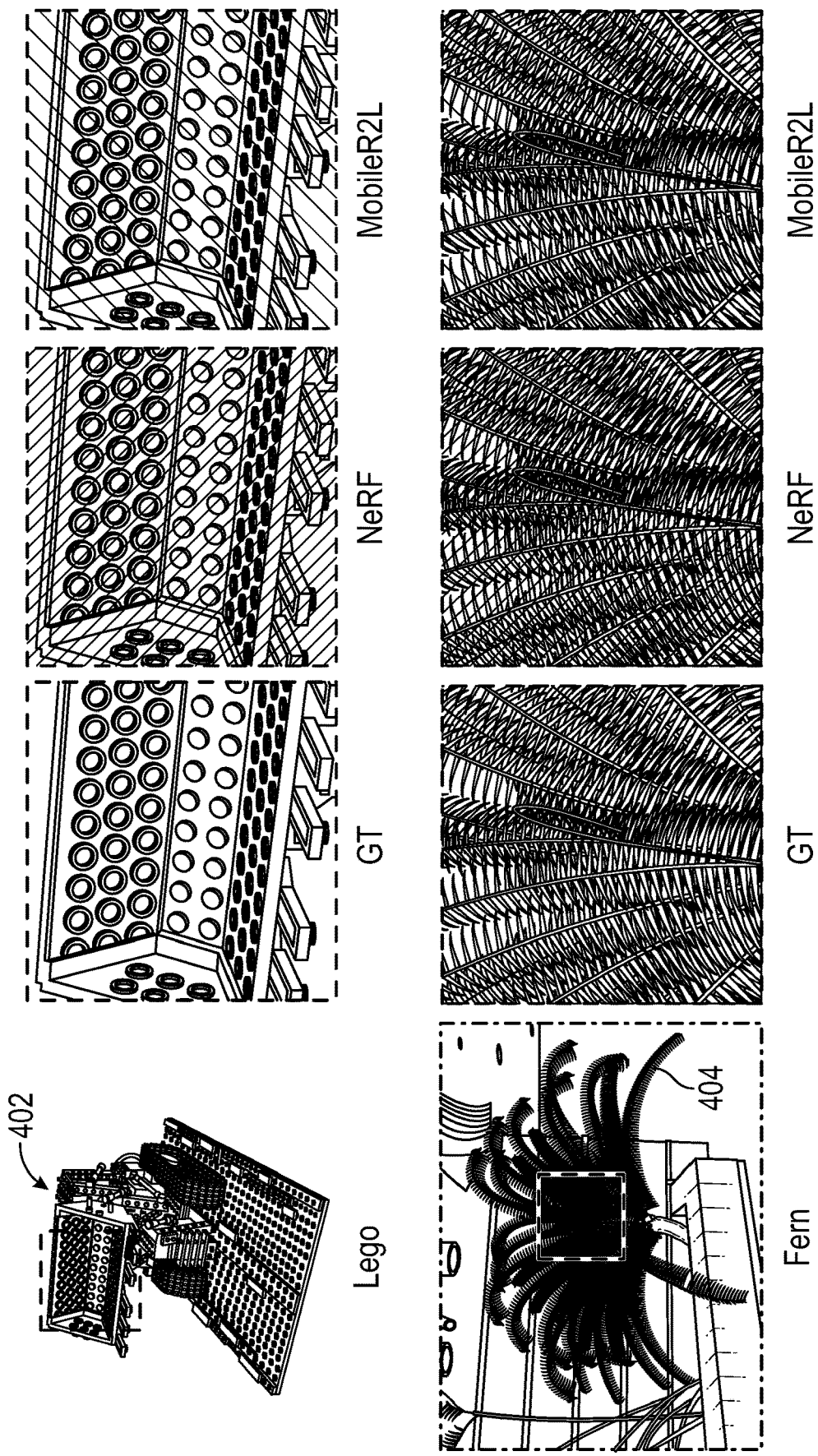
Figure 5:
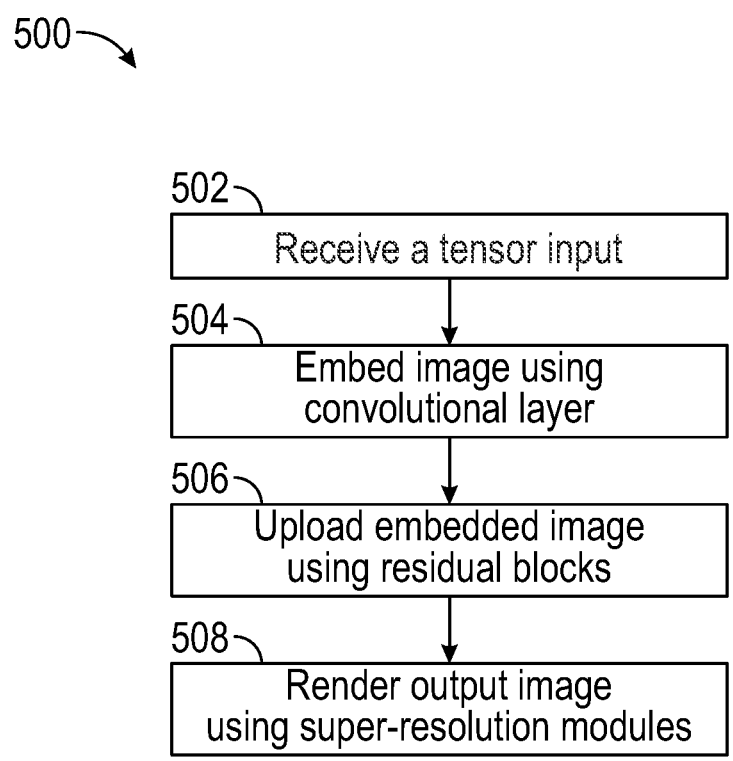
Figure 6:
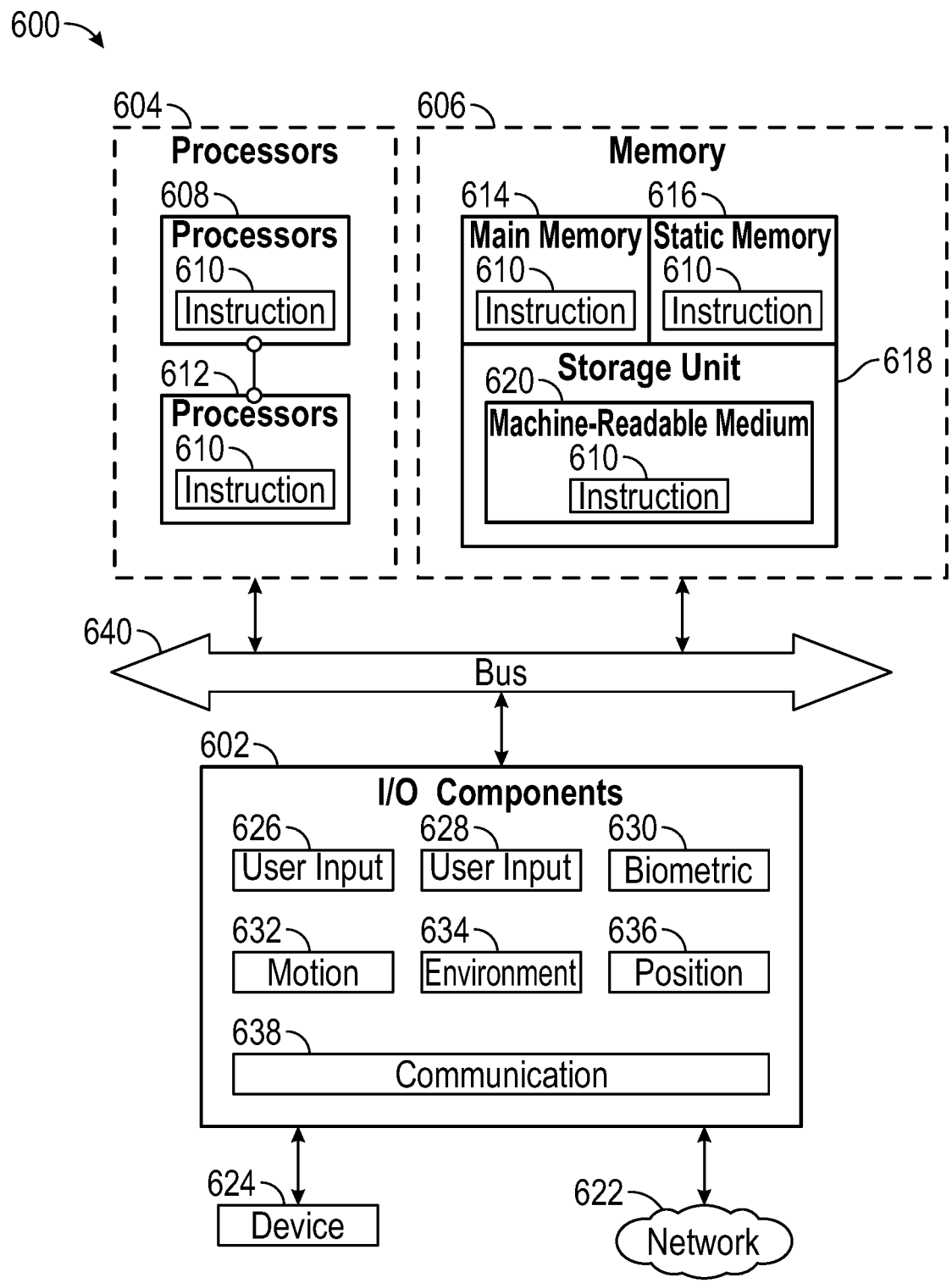
Figure 7:
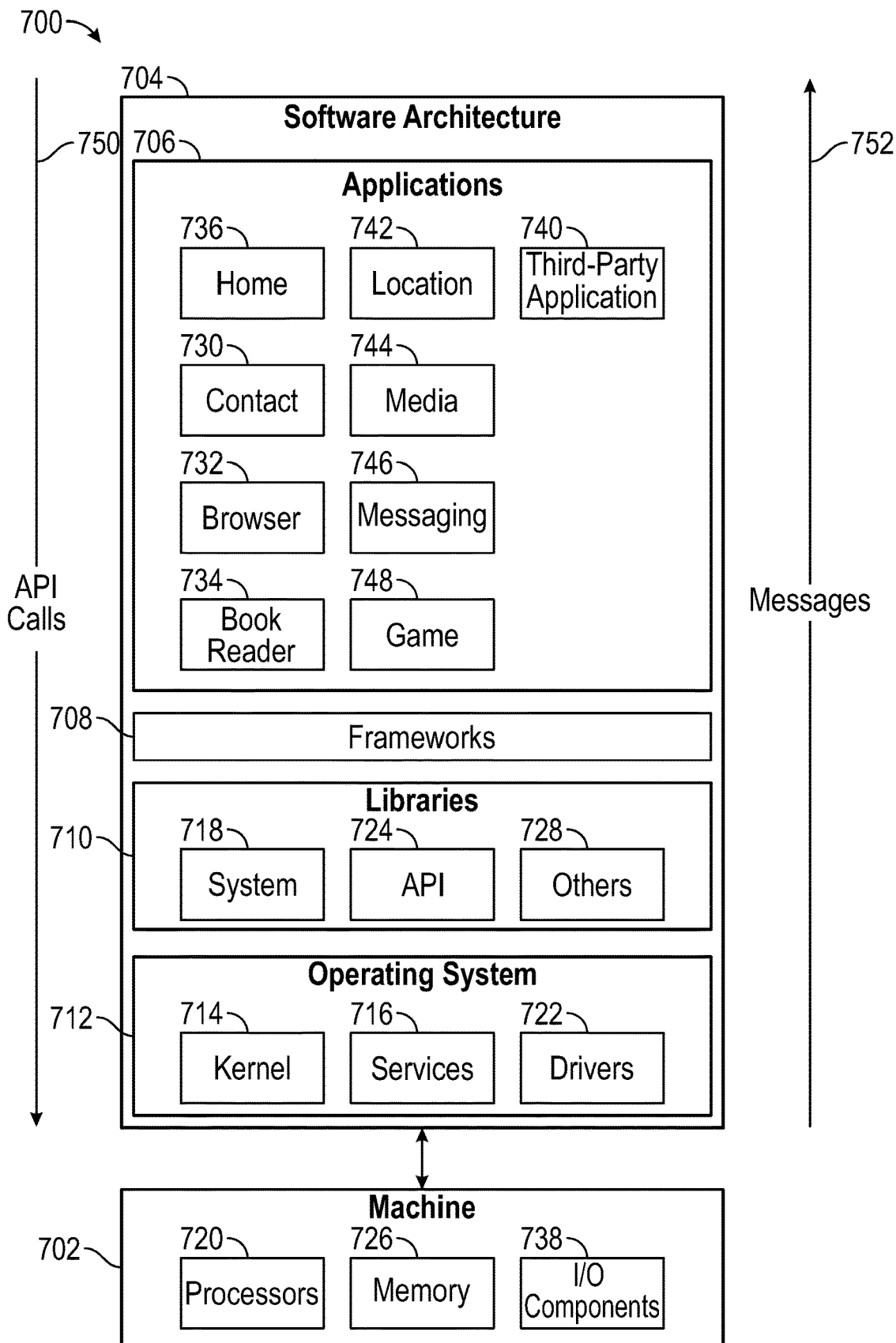

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 1 are illustrations depicting real-time interaction between a mobile device and a user;

FIG. 2 is an illustration depicting super-resolution modules used in a training and inference pipeline;

FIG. 3 is a block diagram illustrating the MobileR2L architecture;

FIG. 4 is an illustration depicting qualitative comparison results on synthetic scenes;

FIG. 5 is a flowchart depicting a method of operating the MobileR2L;

FIG. 6 is a block diagram of a machine within which instructions for causing the machine to perform any one or more of the methodologies described herein may be executed; and FIG. 7 is a block diagram showing a software architecture within which examples described herein may be implemented.

DETAILED DESCRIPTION

A neural light field (NeLF) that runs real-time on mobile devices for neural rendering of three dimensional (3D) scenes, referred to in this disclosure as MobileR2L. The MobileR2L architecture runs efficiently on mobile devices with low latency and small size, and achieves high-resolution generation while maintaining real-time inference for both synthetic and real-world 3D scenes on mobile devices. The MobileR2L has a network backbone including a convolutional layer embedding an input image at a resolution, residual blocks uploading the embedded image, and super-resolution modules receiving the uploaded embedded image and rendering an output image having a higher resolution than the embedded image. The convolution layer generates a number of rays equal to a number of pixels in the input image, where a partial number of the rays is uploaded to the super-resolution modules.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and described below.

The MobileR2L is a real-time neural rendering model operable with mobile devices. Training of the MobileR2L follows a similar distillation procedure of R2L (see R2L: Distilling Neural Radiance Field to Neural Light Field for Efficient Novel View Synthesis by Huan Wang et al., which is incorporated fully herein by reference), created by Snap Inc. of Santa Monica, California, and is a pure NeLF network that avoids the alpha-composition step in rendering of R2L. However, instead of using a MLP (multi-layered perceptron), which is a backbone network used by most neural representations, MobileR2L includes a well-designed convolutional (Conv) network that achieves real-time speed at a quality similar to the teacher model. In an example, a 1×1 Conv layer is used as a backbone. A challenge with running a NeRF/NeLF on mobile devices is an excessive requirement of random access memory (RAM). For example, for a processor to render an 800×800 image, the processor needs to sample 640,000 rays which need to be stored, causing out-of-memory issues. In 3D-aware generative models, this issue is alleviated by rendering a radiance feature volume and upsampling it with a convolutional network to get a higher resolution. The MobileR2L renders a light-field volume which is then upsampled to the required resolution. The MobileR2L features several major advantages over existing works.

The MobileR2L achieves real-time inference speed on mobile devices, as shown in Table 3, with better rendering quality on synthetic and real-world datasets, as shown in FIG. 4. The MobileR2L utilizes an order of magnitude less storage, reducing the model size to 8.3 MB, which is about 15.2x×24.3x less than MobileNeRF.

The MobileR2L unlocks wide adoptions of neural rendering in real-world applications on mobile devices, such as a virtual try-on, where the real-time interaction between devices and users is achieved, as shown at 100 in FIG. 1. FIG. 1 illustrates a user using a mobile phone 102 to perform neural rendering of a persons feet and virtually try-on different types of shoes 104, and display the worn shoes 104 from different angles as shown at 106 and 108. The user can virtually try-on different types of shoes to allow virtual shopping, such that the user can select a chosen pair of shoes for purchase.

NeRF represents a scene implicitly with an MLP network $F_\Theta$, which maps the 5D coordinate (spatial location (x, y, z) and view direction ($\theta$, $\phi$)) to a 1D volume density (opacity, denoted as $\sigma$ here) and 3D radiance (denoted as c) such that $F_\Theta: \mathbb{R}^5 \to \mathbb{R}^4$. Each pixel of an image is associated with a camera ray. To obtain the color of a pixel, the NeRF method samples many points along the camera ray and accumulates the radiance of all these points via alpha compositing:

$$C(r) = \sum_{i=1}^{N} T_i \cdot (1 - \exp(-\sigma_i \delta_i)) \cdot F_\Theta(r(t_i), d), \quad (1)$$

$$T_i = \exp\left(-\sum_{j=1}^{i-1} \sigma_j \delta_j\right),$$

where r means the camera ray; $r(t_i)=o+t_i d$ represents the location of a point on the ray with origin o and direction d; $t_i$ is the Euclidean distance (a scalar) of the point away from the origin; and $\delta_i = t_{i+1} - t_i$ refers to the distance between two adjacent sampled points. A stratified sampling approach is employed in NeRF to sample the $t_i$ in Eqn. (1). To enrich the input information, the position and direction coordinates are encoded by positional encoding, which maps a scalar ($\mathbb{R}$) to a higher dimensional space ($\mathbb{R}^{2L+1}$) through cosine and sine functions, where L (a predefined constant) stands for the frequency order (in the original NeRF, L=10 for positional coordinates and L=4 for direction coordinates).

An issue affecting fast inference in NeRF is that the N, the number of sampled points, in Eqn. (1) is large, such as 256, due to the coarse-to-fine two-stage design. Therefore, the rendering computation for even a single pixel is prohibitively heavy. The solution of using R2L is distilling the NeRF representation to NeLF. However, R2L is still not compact and fast enough for mobile devices.

Essentially, a NeLF function maps the oriented ray (which has 4 degrees of freedom) to red-green-blue (RGB), namely, $G_\Phi: \mathbb{R}^4 \to \mathbb{R}^3$. To enrich the input information, R2L has a new ray representation, by also sampling points along the ray just like NeRF does, but in contrast, by concatenating the points to a long vector. That vector is used as the ray representation and fed into a neural network to learn the RGB. Similar to NeRF, positional encoding is also adopted in R2L to map each scalar coordinate to a high dimensional space. During training, the points are randomly (by a uniform distribution) sampled, and during testing, the points are fixed.

The output of the R2L model is directly RGB, no density learned, and there is no extra alpha-compositing step, which makes R2L much faster than NeRF in rendering. One downside of the NeLF framework is, as shown in R2L, the NeLF representation is much harder to learn than NeRF, so as a remedy, R2L includes an 88-layer deep ResMLP (residual MLP) architecture (much deeper than the network of NeRF) to compute the mapping function Go.

R2L has two stages in training. In the first stage, R2L uses a pre-trained NeRF model as a teacher to synthesize excessive (origin, direction, RGB) triplets as pseudo data, and then the R2L is fed the pseudo data to learn Go. This stage makes the R2L model achieve comparable performance to the teacher NeRF model. In the second stage, the R2L network is finetuned from the last stage on the original data, as this step significantly boosts the rendering quality as shown in the R2L.

The learning process of R2L is followed to train MobileR2L, namely, using a pre-trained teacher model, such as NeRF, to generate pseudo data for the training of a lightweight neural network. To reduce the inference speed, the network is only forwarded once when rendering an image. However, under the design of R2L, although one pixel only requires one network forward, directly feeding rays with large spatial size, e.g., 800×800, into a network causes memory issues. Therefore, R2L forwards a partial of rays each time, increasing the speed overhead.

To improve inferencing, super-resolution modules are used in a training and inference pipeline 200 illustrated in FIG. 2. MobileR2L 300 upsamples a low-resolution input 202, e.g., 100×100, to a high-resolution image shown at 204. Thus, the high-resolution image 204 is obtained with only one forward pass of the neural network during inference time.

The input rays are represented as $x \in \mathbb{R}^{B,6,H,W}$, where B denotes the batch size and H and W denotes the spatial size.

The ray origin and view directions are concatenated as the second dimension of x. Positional encoding γ(•) is applied on x to map the ray origin and view directions into a higher dimension. Thus, the input of the neural network is γ(x).

The MobileR2L 300 architecture in FIG. 3 includes two main parts, an efficient backbone 302 and super-resolution (SR) modules 304 for high-resolution rendering. Instead of using fully connected (FC) or linear layers for the network, only convolution (CONV) layers 306 are applied in the backbone 302 and SR modules 304. The input tensor of MobileR2L 300 has a 4 dimensional (4D) shape: batch (B), channel (C), height (H), and width (W). The backbone 302 includes residual blocks (RB) 308 that are repeated 28 times (N=28). Following the backbone 302, there are two types of SR modules 304. The first SR module (SR1) has a kernel size 4×4 in the transpose CONV layer that doubles the input H, W to 2H, 2 W, whereas the second SR module (SR2) has a kernel size 3×3, tripling the input shape to 3H, 3 W. The configuration of 3×SR1 is used in the Synthetic 360° dataset that upsamples the input 8×. For the real forward-facing dataset, the combination of 2×SR1+SR2 is used that upsamples the input 12×. Moreover, various output channels are used across RB 308 and SR 304: C1=256, C2=64, and C3=16.

There are two main reasons for replacing FC with CONV layers 306. First, the CONV layer 306 is better optimized by compilers than the FC layer. Under the same number of parameters, the model with CONV 1×1 runs around 27% faster than the model with FC layers. Second, if FC is used in the backbone 302, extra reshape and permute operations are required to modify the dimension of the output features from the FC to make the features compatible with the CONV layer 306 in the SR modules 304, as the FC and CONV calculate different tensor dimension. Such reshape or permute operations are not hardware-friendly on some mobile devices. With the CONV layer 306 employed as the operator in the MobileR2L 300, more details are introduced for the backbone 302 and SR modules 304.

The architecture of the MobileR2L backbone 302 follows the design of RBs from R2L. In contrast to R2L, the CONV layer 306 is adopted instead of the FC layer in each RB 308. The CONV layer 306 has the size of kernel and stride as 1. Additionally, the normalization and activation functions are used in each RB 308, which improves network performance without introducing latency overhead. The normalization and activation are chosen as batch normalization and GeLU (Gaussian Error Linear Input) 310. The backbone 302 contains 60 CONV layers 306 in total.

To reduce the latency when running the neural rendering on mobile devices, the neural network is forwarded only once to get the synthetic image. However, the existing network design of the neural light field requires large memory for rendering a high-resolution image, which surpasses the memory constraint of the mobile devices. For example, rendering an image of 800×800 requires the prediction of 640,000 rays. Forwarding these rays at once using the network from R2L causes the out of memory issue even on an Nvidia Tesla A100 GPU (40 G memory).

To reduce the memory and latency cost for high-resolution generation, instead of forwarding the number of rays that equals to the number of pixels, only a partial of rays is forwarded and learn all the pixels via super-resolution. Specifically, the SR modules 304 are used following the efficient backbone 302 to upsample the output to the high-resolution image. For example, to generate a 800×800 high-resolution image, a 4D tensor x is forwarded with spatial size as 100×100 to the network and upsample the output from the backbone 302 three times. The SR modules 304 include the stacking of two RBs 308. The first RB 308 includes three CONV layers 306 with one as a 2D transpose CONV layer and two CONV 1×1 layers, and the second RB 308 includes two CONV 1×1 layers. After the SR modules 304, another CONV layer is applied, followed by the Sigmoid activation to predict the final RGB color. The model is denoted as D60-SR3 where it contains 60 CONV layers 306 in the efficient backbone 302 and 3 SR modules 304.

The image quality of MobileR2L 300 is appreciated by considering three common metrics, including PSNR, SSIM and LPIPS, on the Realistic Synthetic 360° and Real Forward-facing datasets, as shown in Table 1.

TABLE 1

| | Synthetic 360° | | | Forward-facing | | |
|---|---|---|---|---|---|---|
| | PSNR↑ | SSIM↑ | LPIPS↓ | PSNR↑ | SSIM↑ | LPIPS↓ |
| NeRF | 31.01 | 0.947 | 0.081 | 26.50 | 0.811 | 0.250 |
| NeRF-Pytorch | 30.92 | 0.991 | 0.045 | 26.26 | 0.965 | 0.153 |
| SNeRG | 30.38 | 0.950 | 0.050 | 25.63 | 0.818 | 0.183 |
| MoibleNeRF | 30.90 | 0.947 | 0.062 | 25.91 | 0.825 | 0.183 |
| MobileR2L | 31.34 | 0.993 | 0.051 | 26.15 | 0.966 | 0.187 |
| Teacher | 33.09 | 0.961 | 0.052 | 26.85 | 0.8268 | 0.2260 |

Compared with NeRF, MobileR2L 300 achieves better results on PSNR, SSIM, and LPIPS for the synthetic 360° dataset. On the forward-facing dataset, MobileR2L 300 has better SSIM and LPIPS than NeRF. Similarly, MobileR2L 300 achieves better results for all three metrics than MobileNeRF on the real synthetic 360° dataset and better PSNR and SSIM on the forward-facing dataset. Compared to SNeRG, MobileR2L 300 has better PSNR and SSIM on the two datasets.

The performance of the teacher model is shown in Table 2. Note that there is still a performance gap between the student model (MobileR2L) and the teacher model. However, a better teacher model can lead to a student model with higher performance. Compared with MobileNeRF and SNeRG, MobileR2L 300 has the advantage that high-performing teacher models can be leveraged to help improve student training for different application scenarios.

A qualitative comparison of neural rendered objects are shown in FIG. 4 in view of ground truth (GT). On the synthetic scene of a Lego® 402 shown at the top-left of FIG. 4, MobileR2L 300 clearly outperforms NeRF, delivering neurally rendered sharper and less distorted shapes and textures of the Lego® 402. On a real-world scene of a fern 404 shown at the bottom-left of FIG. 4, the image neurally rendered by MobileR2L 300 is less noisy, and the details, such as the leaf tips, are sharper. A zoom-in comparison of the neurally rendered objects with MobileNeRF and MobileR2L is shown in FIG. 4. MobileR2L 300 achieves high-quality neural rendering for the zoom-in view, which is especially important for 3D assets that users might perform zoom-in to look for more details.

An advantage of MobileR2L 300 is that it does not require extra storage, even for complex scenes. As shown in Table 2, the storage size of MobileR2L 300 is 8.3 MB for both synthetic 360° and forward-facing datasets. The mesh-based methods like MobileNeRF demand more storage for real-world scenes due to storing more complex textures. As a result, MobileR2L 300 utilizes 24.3×less disk storage than MobileNeRF on forward-facing and 15.2×less on synthetic 360°.

TABLE 2

| | Synthetic 360° | | | Forward-facing | | |
|---|---|---|---|---|---|---|
| | MoibleNeRF | SNeRG | MobileR2L | MobileNeRF | SNeRG | MobileR2L |
| Disk storage | 125.8 | 86.8 | 8.3 | 201.5 | 337.3 | 8.3 |

The rendering speed of MobileR2L 300 on iPhones® (13 and 14) with iOS 16 where latency (ms) is shown in Table 3, the models are compiled with CoreMLTools.

TABLE 3

| | Synthetic 360° | | Forward-facing | |
|---|---|---|---|---|
| | MobileNeRF | MobileR2L | MobileNeRF | MobileR2L |
| iPhone 13 | 17.54 | 26.21 | 27.15 | 18.04 |
| iPhone 14 | 16.67 | 22.65 | 20.98 | 16.48 |

MobileR2L 300 runs faster on real forward-facing scenes than the realistic synthetic 360° scenes. The latency (ms) discrepancy between the two datasets comes from the different input spatial sizes. MobileNeRF shows a lower latency than the MobileR2L 300 models on the realistic synthetic 360° scene but higher latency on the real-world scenes. Both methods can run in real-time on devices. Note that MobileNeRF cannot render two scenes, i.e., leaves and orchids, due to memory issues, as they require complex texture to model the geometry, while the MobileR2L 300 is robust for different datasets, From the comparison of the rendering quality, disk storage, and inference speed, it can be seen that MobileR2L 300 achieves overall better performance than MobileNeRF. More importantly, considering the usage of neural rendering on real-world applications, MobileR2L 300 is more suitable as it requires much less storage, thereby reducing the constraint for hardware and can render real-world scenes in real-time on mobile devices.

FIG. 5 is a flow chart 500 depicting a method of using the MobileR2L 300 with a processor implementing the method.

At block 502, the network backbone 302 receives a tensor input including an image of a 3D scene. The input tensor has a 4D shape: batch (B), channel (C), height (H), and width (W).

At block 504, the convolutional layer 306 embeds the image. The backbone 302 includes residual blocks (RB) 308 that are repeated N times. In an example, N=28 and there are a plurality of convolutional layers 306, such as 60.

At block 506, the residual blocks 306 upload the embedded image. For example, rendering an image of 800×800 requires the prediction of 640,000 rays. To reduce the memory and latency cost for high-resolution generation, instead of forwarding the number of rays that equals to the number of pixels, only a partial of rays is forwarded and learn all the pixels via super-resolution. Specifically, the SR modules 304 are used following the efficient backbone 302 to upsample the output to the high-resolution image. For example, to generate a 800×800 high-resolution image, the 4D tensor x is forwarded with spatial size as 100×100 to the network and upsample the output from the backbone 302 three times.

At block 508, the super-resolution modules 304 render a high-resolution image that has a resolution higher than the uploaded embedded image. In an example, the first SR module (SR1) has a kernel size 4×4 in the transpose CONV layer that doubles the input H, W to 2H, 2 W, whereas the second SR module (SR2) has a kernel size 3×3, tripling the input shape to 3H, 3 W. The configuration of 3×SR1 is used in the Synthetic 360° dataset that upsamples the input 8×. For the real forward-facing dataset, the combination of 2×SR1+SR2 is used that upsamples the input 12×. Moreover, various output channels are used across RBs 308 and SRs 304: C1=256, C2=64, and C3=16.

FIG. 6 is a diagrammatic representation of the machine 600 within which instructions 610 (e.g., software, a program, an application, an applet, an app, or other executable code) for causing the machine 600 to perform any one or more of the methodologies described herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies described herein. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 for any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

FIG. 7 is a block diagram 700 illustrating a software architecture 704, which can be installed on any one or more of the devices described herein. The software architecture 704 is supported by hardware such as a machine 600/702 (see FIGS. 6 and 7) that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to generate one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as +10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A processor configured to process instructions for a neural light field (NeLF) for neural rendering of three dimensional (3D) scenes, comprising:
a network backbone including:
a convolutional layer configured to embed an input image at a resolution; and
residual blocks configured to upload the embedded input image; and
super-resolution modules configured to receive the uploaded embedded input image from the network backbone and render an output image having a higher resolution than the embedded input image resolution;
wherein the convolution layer is configured to generate a number of rays equal to a number of pixels in the input image, wherein a partial number of the rays is uploaded to the super-resolution modules.

2. The processor of claim 1, wherein the super-resolution modules are configured to learn all the pixels via super-resolution.

3. The processor of claim 1, wherein the residual blocks each have normalization and activation functions.

4. The processor of claim 1, wherein the residual blocks are repeated a plurality of times.

5. A processor configured to process instructions for a neural light field (NeLF) for neural rendering of three dimensional (3D) scenes comprising:
a network backbone including:
a convolutional layer configured to embed an input image at a resolution; and
residual blocks configured to upload the embedded input image; and
super-resolution modules configured to receive the uploaded embedded input image from the network backbone and render an output image having a higher resolution than the embedded input image resolution;
wherein the super-resolution modules include two types of super-resolution modules configured to multiply a tensor input.

6. The processor of claim 5, wherein a first type of super-resolution module multiplies the tensor input a first number of times, and a second type of super-resolution module multiples the tensor input a second number of times that is greater than the first number of times.

7. The processor of claim 5, further comprising a plurality of output channels provided across the residual blocks and the super-resolution modules.

8. The processor of claim 5, wherein the tensor input has a four dimension shape.

9. The processor of claim 1, wherein the network backbone includes a plurality of the convolution layers.

10. A method of using a neural light field (NeLF) comprising a network backbone and super resolution modules, the network backbone including a convolutional layer and residual blocks, the method comprising:
embedding, by the convolutional layer, an input image at a resolution using the convolutional layer;
uploading, by the residual blocks, the embedded input image; and
rendering, by a super-resolution modules, an output image having a higher resolution than the uploaded embedded input image resolution;
wherein the convolution layer generates a number of rays equal to a number of pixels in the input image, wherein a partial number of the rays is uploaded to the super-resolution modules.

11. The method of claim 10, wherein the super-resolution modules learn all the pixels via super-resolution.

12. The method of claim 10, wherein the residual blocks each have normalization and activation functions.

13. The method of claim 10, wherein the residual blocks are repeated a plurality of times.

14. A method of using a neural light field (NelF) comprising a network backbone and super resolution modules, the network backbone including a convolutional layer and residual blocks, the method comprising:
embedding, by the convolutional layer, an input image at a resolution using the convolutional layer;
uploading by the residual blocks, the embedded input image; and
rendering, by a super-resolution modules, an output image having a higher resolution than the uploaded embedded input image resolution, wherein the super-resolution modules include two types of super-resolution modules multiplying a tensor input.

15. The method of claim 14, wherein a first type of super-resolution module multiplies the tensor input a first number of times, and a second type of super-resolution module multiples the tensor input a second number of times that is greater than the first number of times.

16. The method of claim 14, further comprising providing a plurality of output channels across the residual blocks and the super-resolution modules.

17. A non-transitory computer readable medium storing program code, which when executed, is operative to cause a neural light field (NeLF) to perform the steps of:
embedding, by a convolutional layer of a network backbone, an input image at a resolution;
uploading, by residual blocks of the network backbone, the embedded input image; and
rendering, by super-resolution modules, an output image having a higher resolution than the embedded input image resolution;
wherein the convolution layer generates a number of rays equal to a number of pixels in the input image, wherein a partial number of the rays is uploaded to the super-resolution modules.

* * * * *